(12) United States Patent
Jane Santamaria

(10) Patent No.: US 7,604,294 B2
(45) Date of Patent: Oct. 20, 2009

(54) INFANT SEAT FOR MOTORCARS

(75) Inventor: Manuel Jane Santamaria, Palau Solita I Plegamans (ES)

(73) Assignee: Jane, S.A., Palau Solita I Plegamans (Barcelona) (ES)

( * ) Notice: Subject to any disclaimer, the term of this patent is extended or adjusted under 35 U.S.C. 154(b) by 174 days.

(21) Appl. No.: 11/821,869

(22) Filed: Jun. 26, 2007

(65) Prior Publication Data

US 2008/0023994 A1   Jan. 31, 2008

(30) Foreign Application Priority Data

Jun. 30, 2006   (ES) .......................... 200601557 U

(51) Int. Cl.
*A47D 1/10* (2006.01)
*A47C 7/36* (2006.01)
*A47C 7/38* (2006.01)

(52) U.S. Cl. .................................. 297/250.1; 297/410

(58) Field of Classification Search ............. 297/250.1, 297/256.1, 256.11, 410
See application file for complete search history.

(56) References Cited

U.S. PATENT DOCUMENTS

| | | | |
|---|---|---|---|
| 6,623,074 B2 * | 9/2003 | Asbach et al. ............ | 297/250.1 |
| 6,908,151 B2 * | 6/2005 | Meeker et al. ............ | 297/250.1 |
| 6,986,548 B2 * | 1/2006 | Jane Santamaria ....... | 297/250.1 |
| 7,066,536 B2 * | 6/2006 | Williams et al. ......... | 297/250.1 |
| 7,278,683 B2 * | 10/2007 | Williams et al. ......... | 297/250.1 |
| 2004/0070244 A1 * | 4/2004 | Williams et al. ......... | 297/250.1 |
| 2004/0189068 A1 * | 9/2004 | Meeker et al. ............ | 297/250.1 |
| 2005/0082888 A1 * | 4/2005 | Williams et al. ......... | 297/250.1 |
| 2006/0261656 A1 * | 11/2006 | Davis ...................... | 297/410 X |
| 2006/0273637 A1 * | 12/2006 | Yumoto et al. ........... | 297/250.1 |
| 2008/0030054 A1 * | 2/2008 | Williams et al. ......... | 297/250.1 |
| 2008/0136232 A1 * | 6/2008 | Hutchinson et al. ...... | 297/250.1 |

\* cited by examiner

*Primary Examiner*—Rodney B White
(74) *Attorney, Agent, or Firm*—Merchant & Gould P.C.

(57) ABSTRACT

The seat (1) includes a backrest (3) with lateral protections (4), and a liftable headrest (5). This infant seat backrest is inferiorly provided with a complementary member (7) being linked to the headrest (5) by a mechanism (8) that when lifting (F) the headrest brings about a downwardly shifting motion (F') of the complementary member (7) of the backrest. The mechanism (8) is arranged between a rear plate (9) and a front plate (10) making up the backrest, the headrest (5) and the complementary member (7) of the backrest having guiding elements (11) for their shifting between the two plates (9 and 10). The mechanism has an element (12) being rotatably secured at its center (13) and having a respective link (14 and 15) fitted to each of its ends, the links being respectively linked to the headrest (5) and to the complementary member (7) of the backrest.

1 Claim, 2 Drawing Sheets

INFANT SEAT FOR MOTORCARS

FIELD OF THE INVENTION

The seats of this kind are generally meant to be installed on the rear seats of the motorcars for the children's safety.

BACKGROUND OF THE INVENTION

These infant seats comprise the very seat itself, a backrest with lateral protections, and a liftable headrest being also generally provided with lateral protections, said infant seats being designed for children of different ages, particularly for those of more than one year of age.

The headrest forms a separate piece being adapted to be fitted to the backrest in an upwardly shiftable arrangement in order to thus be in a position to be adapted to the child's height and to thus still protect this latter's head, the lateral protections of the backrest nevertheless remaining in a stationary arrangement and hence not properly fulfilling their function because their low position does not offer an adequate protection for the lateral shifting motions of the child such as those possibly occurring during the sudden changes of direction of the motorcar, for example.

SUMMARY OF THE INVENTION

In order to solve this problem the infant seat being the object of this invention has been devised wherein the lateral protections of the backrest are also lifted with respect to the very seat itself when lifting the headrest.

In order to achieve this improvement the backrest is inferiorly provided with a complementary member being linked to the headrest by means of a mechanism that when lifting the headrest brings about a downwardly shifting motion of the complementary member of the backrest and thus results in having the lateral protections of the backrest arranged in a more elevated arrangement with respect to the very seat itself.

The aforementioned mechanism is arranged between a rear plate and a front plate making up the backrest, the headrest and the complementary member of the backrest having guiding elements for their shifting between said two plates. This mechanism comprises an element being rotatably secured at its centre and having a respective link fitted to each of its ends, said links being respectively linked to the headrest and to the lower complementary member of the backrest.

These and other characterising features will be best made apparent by the following detailed description whose understanding will be made easier by the accompanying two sheets of drawings showing a practical embodiment being cited only by way of example not limiting the scope of the present invention.

DETAILED DESCRIPTION

Figure 1:
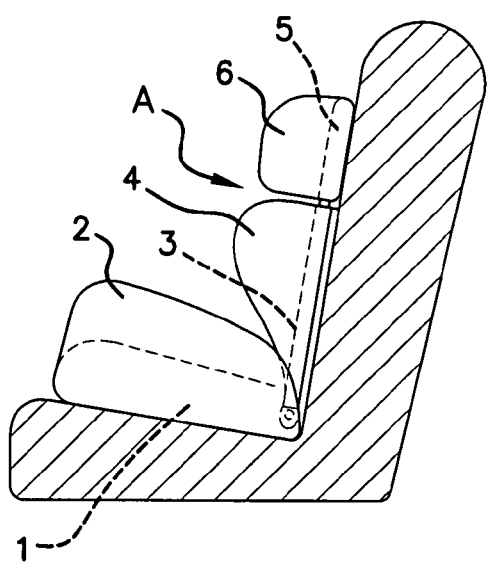
FIGS. 1 and 2 diagrammatically depict in a side elevation an infant seat of the conventional type with its headrest in a lowered and in a lifted position, respectively.
Figure 2:
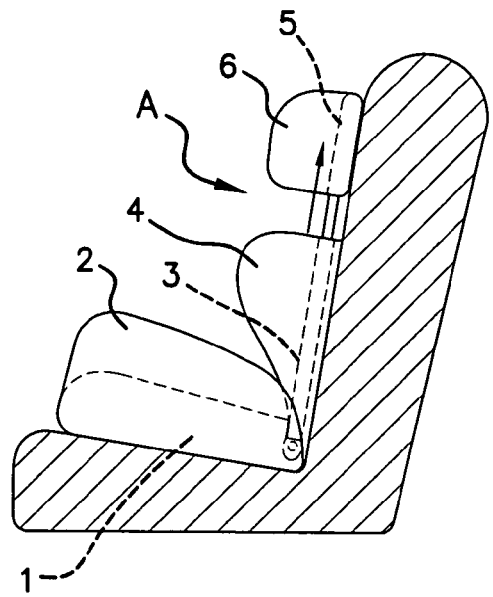

The infant seats (A) (FIG. 1) of this kind comprise the very seat itself (1) with armrests (2) to which a backrest (3) with lateral protections (4) is articulately fitted, a headrest (5) also with lateral protections (6) being fitted to said backrest in a slidable arrangement so as to thus be in a position to be lifted as shown in FIG. 2. As can be seen in this figure, as the child grows its head is as well protected, the lateral protections (4) of the backrest nevertheless remaining in a low position and thereby nor offering a correct protection for the child during its possible lateral shifting motions.

Figure 3:
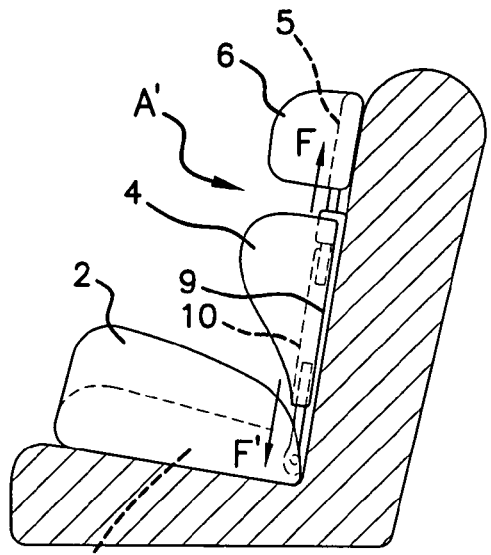
FIG. 3 diagrammatically depicts in a side elevation the infant seat being the object of the invention showing the lifted position being assumed by the lateral protections of the backrest when lifting the headrest.
Figure 4:
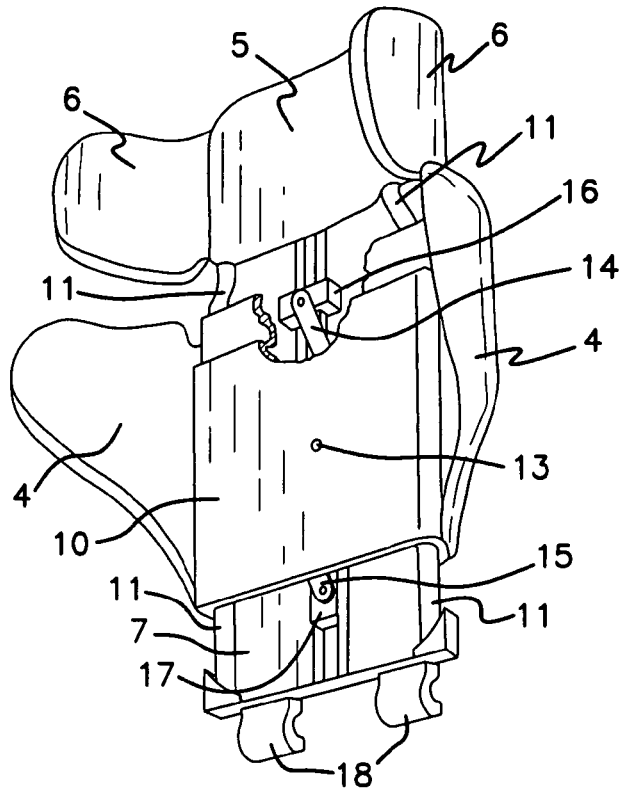
FIG. 4 diagrammatically illustrates in a perspective view the backrest-headrest assembly pertaining to the infant seat in question.
Figure 5:
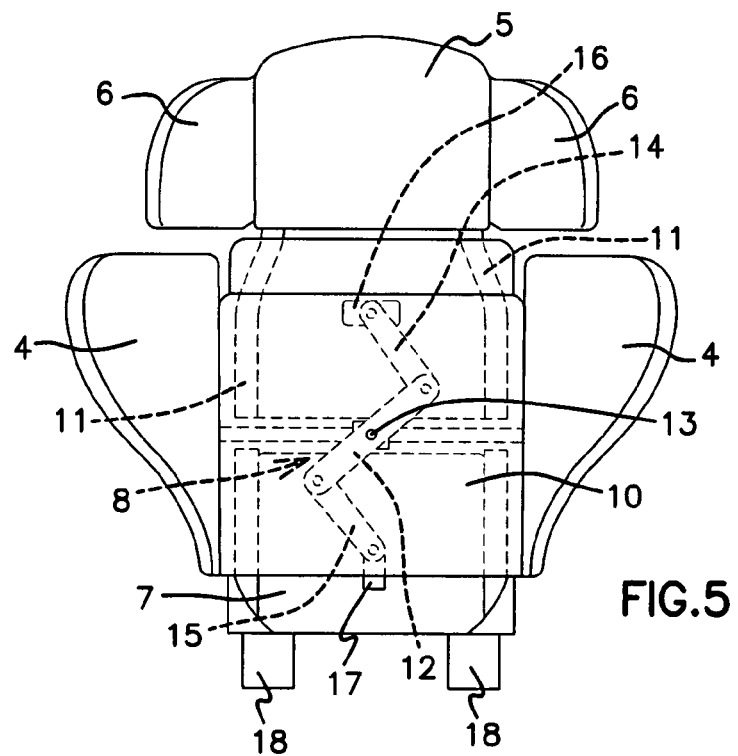
FIGS. 5 and 6 diagrammatically show in a front elevation the aforementioned backrest-headrest assembly in a lowered and in a lifted position, respectively.
Figure 6:
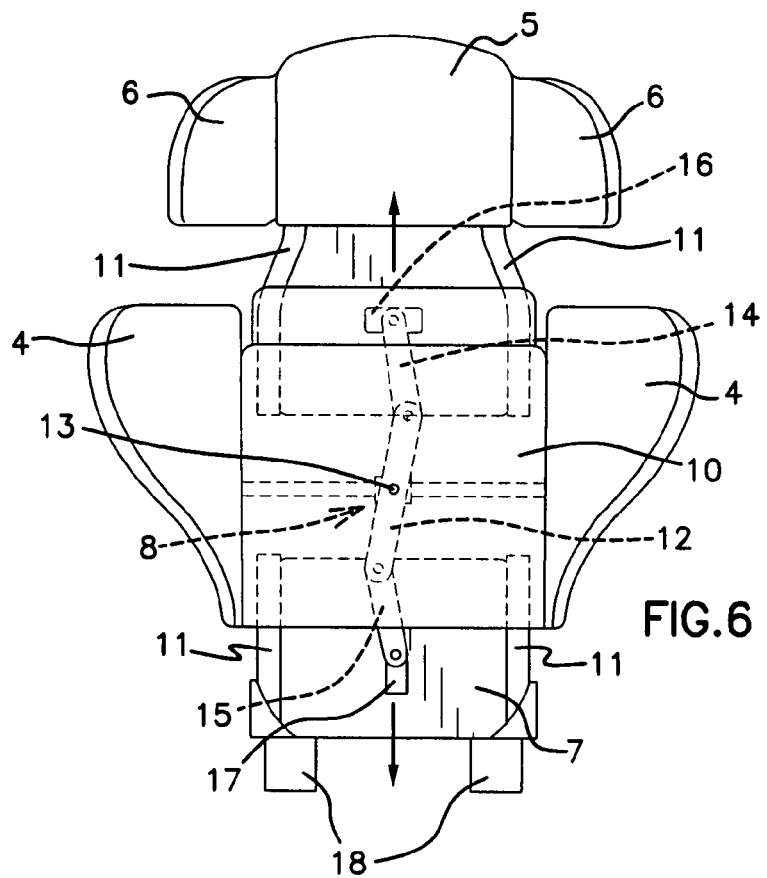

This drawback has now been obviated with the infant seat (A') being the object of this invention wherein in FIG. 3 it can be seen how the lateral protections (4) of the backrest also assume a more elevated position when lifting the headrest (5).

In order to achieve these elevations the backrest is inferiorly provided with a complementary member (7) being linked to the headrest (5) by means of a mechanism (8) that when lifting the headrest as per arrow F brings about the downwardly shifting motion as per arrow F' of the complementary member (7) of the backrest, the lateral protections (4) of this latter being thus arranged in a more elevated arrangement with respect to the very seat (1) itself.

The aforementioned mechanism (8) is arranged between a rear plate (9) and a front plate (10) making up the backrest, the headrest (5) and the complementary member (7) of the backrest having guiding elements (11) for their shifting between said two plates.

The aforementioned mechanism (8) in this case comprises an element being formed by a flat (12) being rotatably fitted at its centre (13) to a pin being secured to the plate (10), the flat (12) having fitted to each of its ends a respective one of two links (14) and (15) being linked by means of respective fixtures (16) and (17) to the headrest (5) and to the complementary member (7) of the backrest, respectively. This mechanism can be replaced with another one allowing to have the headrest (5) and the complementary member (7) of the backrest linked to each other in the above manner.

The aforementioned complementary member (7) is made up by a plate at its lower edge comprising couplings (18) for removably and articulately fitting the backrest to the seat (1).

Both the backrest and the headrest can have their lateral protections (4) and (6) provided with a mechanism being fit to adjust their separation in order to adapt it to the child's width.

The invention claimed is:

1. An infant seat for motorcars, the infant seat comprising:
a seat;
a backrest comprising a liftable headrest, lateral protection devices, a lower support, and a front plate and a rear plate; the headrest and the lower support having guide elements between the front plate and the rear plate;
a mechanism arranged intermediate the front plate and the rear plate, the mechanism comprising an element rotatably secured at its center and having a first link attached to a first end of the element and to the headrest, and a second link attached to a second end of the element and the lower support, the lower support remaining at a stationary height as the headrest is raised; the guide elements facilitating shifting of the headrest and the lower support relative to the front and rear plates; and the mechanism determining the height of the lateral protection devices as the headrest is raised.

* * * * *